Patented Aug. 14, 1928.

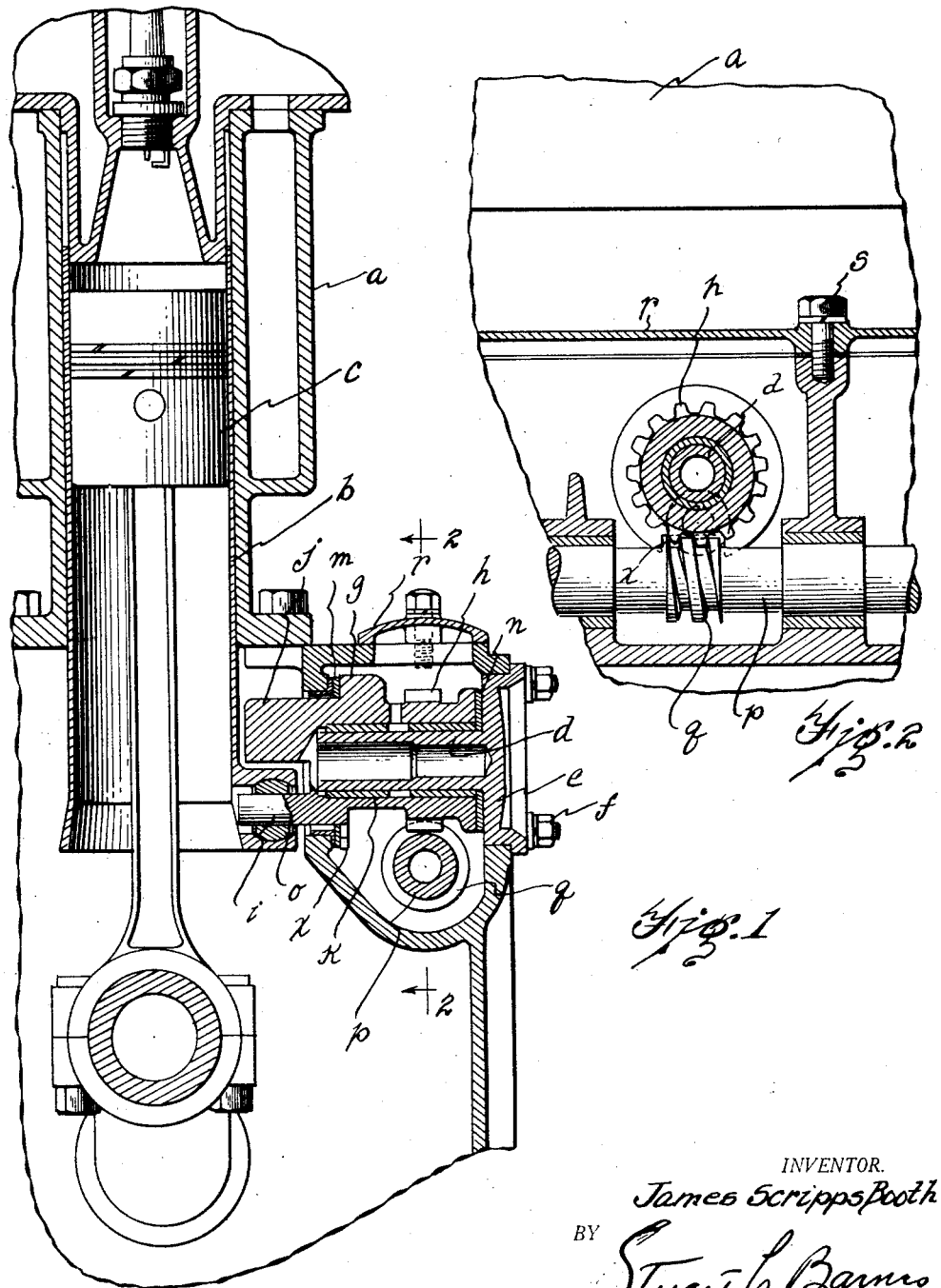

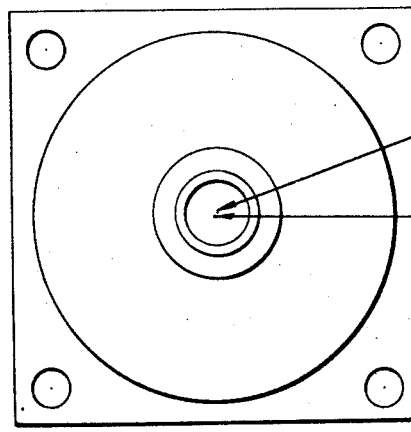
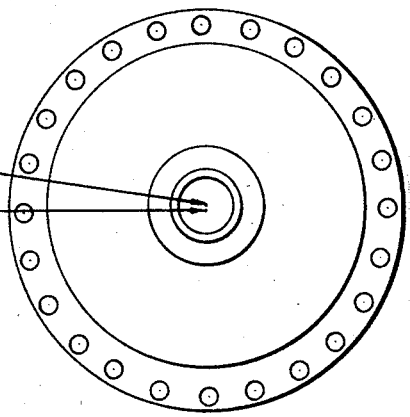
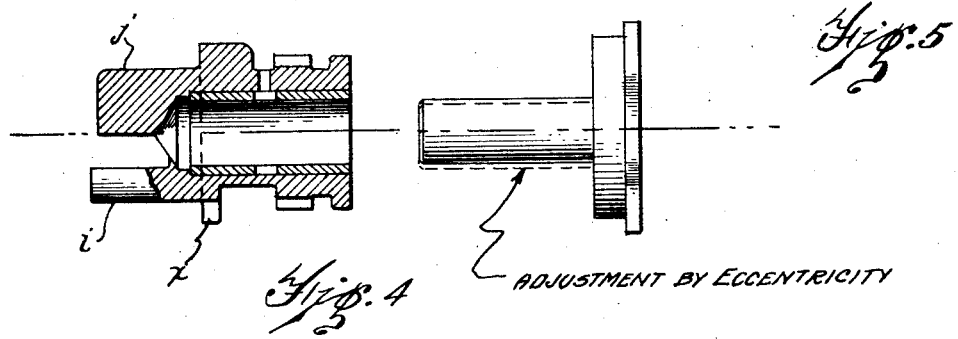

1,680,445

UNITED STATES PATENT OFFICE.

JAMES SCRIPPS BOOTH, OF DETROIT, MICHIGAN.

SLEEVE-VALVE GEAR.

Application filed July 24, 1925. Serial No. 45,799.

This invention relates to an adjustable drive for a sleeve of a sleeve valve motor. A further feature of the invention is an arrangement of structure which makes an inspection opening a useful adjunct.

In sleeve valve motors, especially the so-called Argyll motor it is customary to reciprocate and oscillate the single sleeve by means of a crank which is part of the stub shaft on which is keyed the driven worm gear. It is usual to employ two large bearings at the opposite ends of the stub shaft for supporting the stub shaft. These bearings and the shaft itself have to be as large as the throw of the crank pin, for otherwise it would not be possible to remove the stub shaft and the crank pin. Furthermore, one of the bearing bushings has to be pressed into the gear housing casting.

In an engine of this kind very often some of the gears become noisy due to the improper adjustment of the clearance between the worm gears and the worms. As far as I know, the only remedy for this situation heretofore has been to locate the trouble and then completely remove the noisy driven unit and replace it by a new driven unit so cut as to give what is considered the proper clearance.

In all the constructions with which I have been familiar of this type of engine structure, no inspection opening or cover has ever been used with a driven unit of a sleeve valve motor. My invention contemplates the use of such an inspection opening together with a small removable driven unit, the large inspection opening cooperating with the small driven unit in providing light and space for vision to assist the assembly man in sliding the crank pin into the ball unit carried by the sleeve valve. The opening is also valuable in aiding the mechanic in locating the noisy gear set.

In the drawings:

Fig. 1 is a vertical fragmentary section through the motor of the Argyll type.

Fig. 2 is a vertical section on the line 2—2 of Fig. 1.

Figs. 3 and 4 are views of the spindle and spindle plate, showing the eccentricity of the spindle and how the gear and spindle are assembled together.

Fig. 5 is a view of a modified form of the plate which provides a larger number of adjustments.

$a$ designates the cylinder block in which is reciprocable and oscillatable, the sleeve valve $b$ on the inside of which slides the piston $c$. This is all well known construction in a number of single valve sleeve motors, particularly the so-called Argyll motor. In order to get this combined reciprocating and oscillating action, it is usual to employ a crank pin connected with the lower end of the sleeve. This crank pin is on the end of a stub shaft, which is ordinarily supported on two bearings, one at each end of the stub shaft. Obviously, these bearings and stub shaft have to be as large as the diameter of the crank throw in order to permit the removal of the unit. This results in bearings of undesirable size and also one of which has to be pressed into the casting, but it is unavoidable in view of the nature of the structure. Furthermore, no way of adjusting the driven gear with respect to the drive shaft is known or has been used, so far as I am aware.

In place of this stub shaft supported at both ends I employ a spindle $d$ which is an integral part of the cover plate $e$ which is bolted to the crank case casting by the bolts and nuts $f$. Rotatably mounted on this is the driven element $g$ which has worm gear teeth $h$ cut in its periphery, the crank pin $i$ and a counter-balancing mass $j$. Suitable bushings $k$ are pressed into the driven element while thrust washers $m$ and $n$ take the end thrust. $o$ designates a part spherical bearing member or ball which is slidable on a pin $i$ and also rotatable thereon and which is rotatable in and rockable in the part spherical bearing machined out of the projecting driven lug of the sleeve valve. A drive shaft is designated $p$ and is provided with the usual worm $q$.

The center of the spindle $d$ is slightly eccentric to the center of the plate which supports it. Now, obviously, if the plate is turned around through a quarter of a turn, as is possible with the plates shown in Figs. 3 and 1, or through even a smaller part of a turn as is possible with the plate shown in Fig. 5, the amount of clearance of the teeth of the worm gear with respect to the worm is accordingly changed. It is possible of course, to simply use a friction clamp arrangement of the plate to secure an infinite number of adjustments, but I find that a quarter turn adjustment of the plate or such an adjustment as is shown in Fig. 5 is sufficient for the practical needs of a motor of this kind.

That part of the crank case casting which I call the valve gear housing or housings, is provided above the gears with a cover plate $r$ secured to the housing by cap screws $s$. This permits the removal of the inspection plate to observe the action of the gears and very much facilitates the working of the noisy pair of gears. Furthermore, the inspection opening may bridge several sets of gears permitting considerable light to enter. With the driven unit, constructed as I have explained this permits one in a measure to watch the crank pin and the ball in the end of the sleeve so that the assembly man can more easily find the hole for the crank pin. Under the old arrangement he was absolutely in the dark and the assembly was a difficult tedious job.

Another feature of this construction is that with this bearing a very much larger space is provided so that a larger counterweight may be employed to more nearly neutralize the forces, not only of the crank pin but also the sliding sleeve.

Preferably I employ a notch $x$ in the gear hub to permit the unit to clear the worm gear more easily when removed.

What I claim is:

1. In a sleeve valve motor the combination of a housing, a drive shaft and drive member contained therein, a driven member and a support supported in the housing only at one end for said driven member, said support and driven member being removable from the housing as a unit.

2. In a sleeve valve motor, the combination of a gear housing, a cover plate, a spindle integral with said cover plate and a driven gear and valve actuating means comprising a single removable unit supported by said spindle.

3. In a sleeve valve motor, the combination of a valve gear housing, a drive shaft and drive member rotatable therein, a driven member cooperating therewith, a spindle and cover plate, the spindle being connected with and supported only by the cover plate and rotatably supporting the driven member, said cover plate, spindle and driven member being removable from the housing as a unit.

In testimony whereof I have affixed my signature.

JAMES SCRIPPS BOOTH.